United States Patent [19]

Bettcher

[11] Patent Number: 4,492,027

[45] Date of Patent: Jan. 8, 1985

[54] ROTARY HAND KNIFE

[75] Inventor: Louis A. Bettcher, Amherst, Ohio

[73] Assignee: Bettcher Industries, Inc., Birmingham, Ohio

[21] Appl. No.: 485,738

[22] Filed: Apr. 18, 1983

Related U.S. Application Data

[63] Continuation-in-part of Ser. No. 318,386, Nov. 5, 1981, Pat. No. 4,439,924.

[51] Int. Cl.[3] ............................................ A22C 17/04

[52] U.S. Cl. ........................................ 30/276; 17/1 G

[58] Field of Search .......................... 17/1 G, 1 R, 67; 30/276, 263, 264

[56] References Cited

U.S. PATENT DOCUMENTS

| | | | |
|---|---|---|---|
| Re. 25,947 | 12/1965 | Bettcher | 30/276 |
| 2,827,657 | 3/1958 | Bettcher | 17/1 G |
| 3,269,010 | 8/1966 | Bettcher | 30/276 |
| 3,688,403 | 9/1972 | Bettcher | 30/276 |
| 3,852,882 | 12/1974 | Bettcher | 30/276 |
| 4,142,291 | 3/1979 | Bettcher | 30/276 |
| 4,166,317 | 9/1979 | Bettcher | 30/276 |
| 4,170,063 | 10/1979 | Bettcher | 30/276 |
| 4,175,321 | 11/1979 | Bettcher | 30/276 |
| 4,178,683 | 12/1979 | Bettcher | 30/276 |
| 4,198,750 | 4/1980 | Bettcher | 30/276 |
| 4,236,531 | 12/1980 | McCullough | 30/276 |
| 4,363,170 | 12/1982 | McCullough | 17/1 G |

*Primary Examiner*—Jimmy C. Peters
*Attorney, Agent, or Firm*—Watts, Hoffmann, Fisher & Heinke

[57] ABSTRACT

An improved hand knife 20 of the type used for trimming meat with a rotary gear-driven ring-like blade 34 guided by a ring-like housing 30. The blade is retained by a partial peripheral flange 90 of the housing and a pivoted retaining shoe 36 secured to the knife hand piece 22. A securing screw 40 and an adjustable abutment 80 retain and position the shoe against the blade. The arrangement allows convenient blade changing. A handpiece 22 has asymmetrically flared recesses 56, 130, 132 adjacent the blade for promoting discharge of product particles that tend to accumulate. The shoe and housing substantially cover gear teeth 42 of the blade.

15 Claims, 11 Drawing Figures

ROTARY HAND KNIFE

DESCRIPTION

Related Application

This application is a continuation-in-part of copending application Ser. No. 318,386 filed Nov. 5, 1981 now U.S. Pat. No. 4,439,924 issued Apr. 3, 1984 the disclosure of which is hereby incorporated herein by reference.

TECHNICAL FIELD

This invention relates to an improved hand knife of the type used for trimming meat with a rotary driven ring-like blade, and to improved parts thereof.

BACKGROUND ART

Rotary knives with ring-like power-driven blades of the type pertaining to this invention are exemplified by such structures as shown in U.S. Pat. No. Re. 25,947 and U.S. Pat. No. 4,175,321. Such knives have a rotary ring-like or annular blade, generally frusto-conical in form, sharpened at one axial end and incorporating gear teeth to form a ring gear portion at the other axial end. The ring gear portion is located and guided by a ring-like housing that is secured to a handpiece. The blade is driven by a pinion carried by the handpiece. A flexible cable driven by an external motor, or an air motor incorporated into the handpiece, drives the pinion.

In constructions such as those shown in U.S. Pat. No. Re. 25,947, and U.S. Pat. No. 4,175,321, an arm-like sector portion extends around one side of the blade and housing, to support a blade-retaining shoe held in place by several securing screws and located by stop screws. The shoe is clamped directly against the blade, squeezing it slightly against the housing to retain it. The operations required for the release or removal and subsequent readjustment of the blade-retaining shoe for blade changing discourage blade substitution during use of the knife, such as during a work shift; yet, cutting efficiency depends upon use of a sharp blade. Also, dull blades result in waste product because deeper cuts are required to get the blade started into the meat. Because of the difficulty in replacing blades during a work shift, an operator will typically only apply a sharpening steel to the blade while using the knife, in an attempt to maintain sharpness. After a day of use, or sometimes more, the retaining shoe will be removed and the blade sharpened or replaced, typically by shop or maintenance personnel. Unfortunately, steeling of a blade does not maintain or produce an optimum cutting edge and substantially greater efficiency is achieved if a properly sharpened blade is substituted every two to four hours of use.

To permit blade removal and to keep the profile or cross sectional area of the housing small in the part of the housing that extends from the handpiece and passes through the product being cut, the housing was not constructed to restrain movement of the blade in an axial direction away from the housing, reliance being instead upon the retaining shoe adjacent the handpiece. As long as the knife was pushed against a product or pulled substantially parallel with the surface of a product, this was satisfactory, but on occasions the knife is urged in a direction away from the surface during cutting, in which case the part of the blade beyond the retaining shoe tends to be pulled from the housing. This may result in loss of control of the depth of the cut as well as mechanical difficulties.

The invention disclosed and claimed in the above-identified application Ser. No. 318,386 now U.S. Pat. No. 4,439,924 issued Apr. 3, 1984 provides an improved rotary knife having a new and improved blade housing, blade, and blade-retaining shoe construction that overcome the above disadvantages and permit convenient removal and replacement of the blade without removal of shoe retaining screws, or the shoe itself, or other parts of the knife from the handpiece, and additionally retain the blade in an improved manner. The knife comprises a handpiece, a ring-like blade housing removably attached to the handpiece, a frusto-conical ring blade located and guided for rotation by the housing, and a blade-retaining plate or shoe adjustably and removably held against the housing and blade. The blade has gear teeth that form a ring gear portion adjacent the housing, a beveled or frusto-conical outer periphery about the ring gear portion against which blade-retaining surfaces of the plate and housing act, and a circular cutting edge that extends forwardly from the housing. The blade is driven by a pinion in the handpiece, engaged with the ring gear portion. In use, a portion of the blade and housing is moved through a work body and cut product passes through the central open part of the blade and housing. The particular embodiment disclosed therein is used primarily to trim fat or skin from the surface of meat. The circular blade housing has a partial peripheral flange that captures a circumferential portion of the blade farthest from the handpiece to restrain axial movement of the blade. The flange extends circumferentially a distance no greater than 180 angular degrees about the blade. The remainder of the housing provides a flat annular support surface against which the ring gear portion of the blade slides during rotation.

The knife handpiece, disclosed in said copending application, has an arcuate end with an arm-like sector portion extending from one side of a handle about a portion of the housing. The plate-like blade-retaining shoe extends along the arcuate end of the handpiece and is pivotably attached at one end to the end of the sector portion. An inside arcuate beveled edge of the shoe engages the outer beveled surface of the blade, and a flat face surface of the shoe is positioned against the unflanged portion of the housing adjacent to the arcuate end of the knife handpiece. The beveled edge retains the blade within the housing flange and against the unflanged part of the housing. A securing member carried with the handpiece cooperates with the shoe to hold it against the housing while allowing pivotal movement of the shoe in the plane of the shoe for adjustment toward or away from the blade periphery. The securing member also readily releases the shoe to allow the shoe to swing about its pivotal attachment to a position away from the housing, allowing the blade to be moved toward the handpiece, out of captured relationship with the peripheral housing flange, for removal. An adjustable abutment carried by the handpiece engages an outer edge of the shoe when the shoe is in blade-retaining position. Through hand-adjustment, the abutment can be moved to pivot the shoe about its attached end to locate and retain the inside beveled edge of the shoe against the outer frusto-conical peripheral surface of the ring gear part of the blade, with adequate frictional contact to hold the blade in operating position relative to the housing, yet sufficiently free to rotate.

One problem encountered with the above-described knife was an accumulation of small product scraps about the drive pinion of the handpiece, behind a pinion cap that covered the pinion and extended closely over a part of the blade engaged with the pinion. The product not only tended to jam inbetween the cap and blade and thereby bind against the blade, but also accumulated in a counterbore of the arcuate handpiece face in which the pinion was recessed and interfered with pinion rotation and engagement of the pinion with the gear teeth of the blade. This necessitated disassembly and cleaning during use.

DISCLOSURE OF THE INVENTION

In considering the above problem, it was found that a contributing factor was the presence of gaps at the ends of the blade-retaining shoe, between the shoe and the partial peripheral flange of the housing. The gaps between adjacent ends of the shoe and flange exposed several teeth of the ring gear part of the blade. As a result, the exposed teeth would catch and carry product around with the blade into the area of the drive pinion, where it would be caught by the pinion teeth, accumulate and pack in about the pinion behind the pinion cap. To avoid this, an improved housing and shoe construction has been provided that locates the ends of the shoe and the ends of the housing flange directly adjacent each other with a gap width of less than the width of a ring gear tooth. Also, a modified shape to the shoe is provided that covers the ring gear teeth adjacent the pivot, up to the housing flange while still allowing pivoting of the shoe for adjustment without binding against the blade. A pivot is provided that permits movement of the shoe away from the handpiece, longitudinally of the pivot axis, to accommodate the modified shape of the shoe at the pivoted end, allowing the shoe to swing out of position to change blades.

An improved handpiece is provided in which a recess for the pinion gear and recesses for screw heads that retain the blade housing to the handpiece are shaped asymmetrically to provide a flare at one side only of an opening of each recess through a planar surface of the handpiece against which the blade housing seats. The flared portion, on the downstream side of each recess, considered in relation to the direction of blade rotation, is located to promote discharge of product particles carried into the respective recesses and around the periphery of the screw head or pinion in the recess. This prevents build-up of product, which inhibits pinion and blade rotation.

To further prevent product particles or scraps from interferring with blade rotation, an improved pinion cap is provided that is spaced from the blade surface a sufficient distance to allow the particles or scraps carried by the blade to move past the pinion and out from behind the cap. It was determined that a greater gap, rather than a tight fit between the cap and blade, produced the better solution to the problem of keeping product particles from interferring with blade rotation.

As suggested by the foregoing, the present invention provides an improved handpiece for a hand knife for cutting meat or the like, comprising a handle portion adapted to be grasped by an operator, a portion for supporting a ring-like blade housing and blade, and a recess in the handpiece for a pinion gear that drives the blade in rotation, the recess opening through a surface of the handpiece that provides a seat for the blade housing, said recess having an outward flare at one side only of said opening. The present invention also provides an improved blade-retaining shoe and pinion cap that contribute with the handpiece to avoid build-up of product particles or scrap in the blade-driving mechanism.

The above and other features and advantages of the invention will be better understood from the detailed description that follows.

BRIEF DESCRIPTION OF THE DRAWINGS

The details of the invention will be described in connection with the accompanying drawings, in which.

BEST MODE FOR CARRYING OUT THE INVENTION

Figure 1:
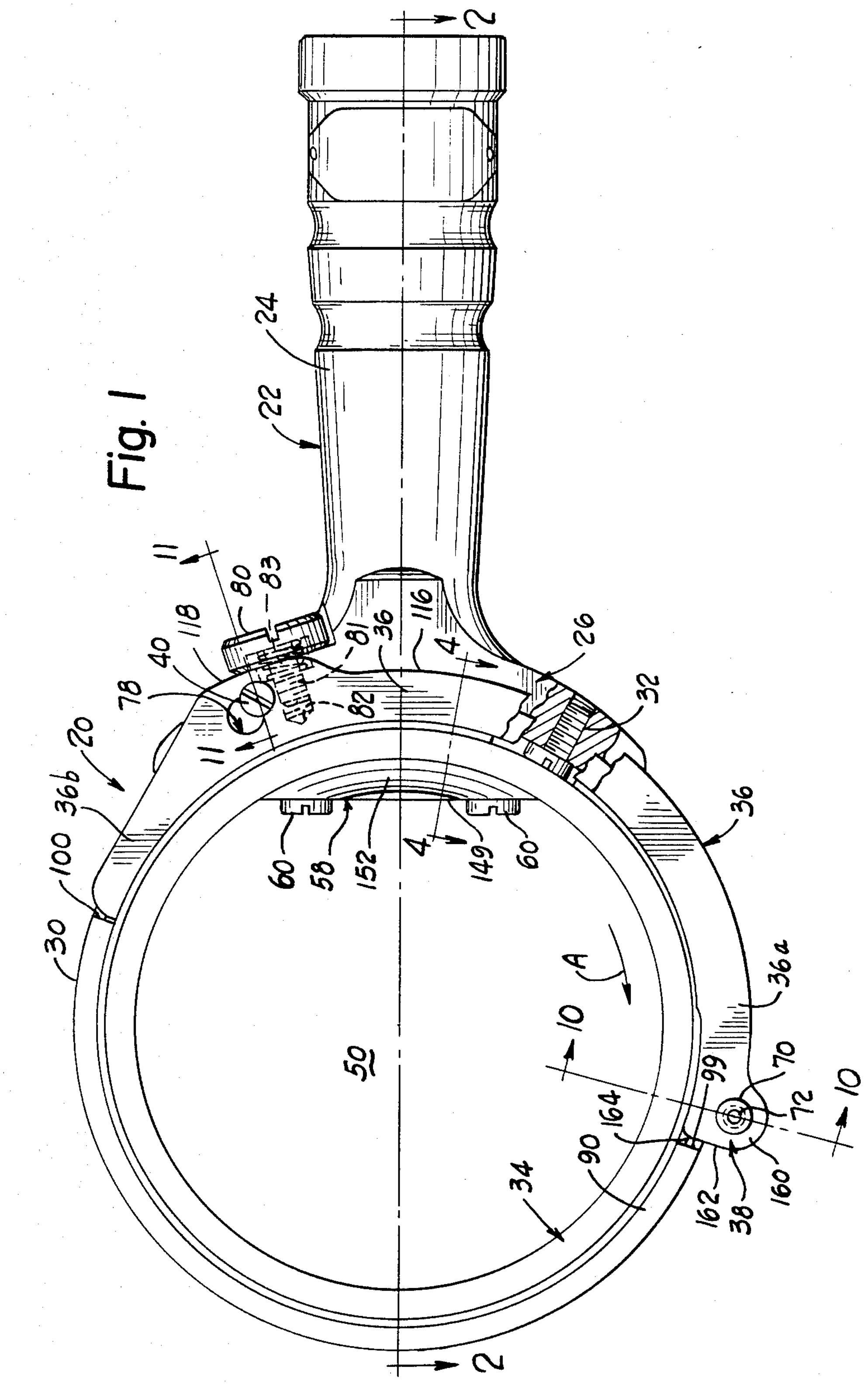
FIG. 1 is a front elevational view of a hand knife embodying the present invention, with parts broken away.
Figure 2:
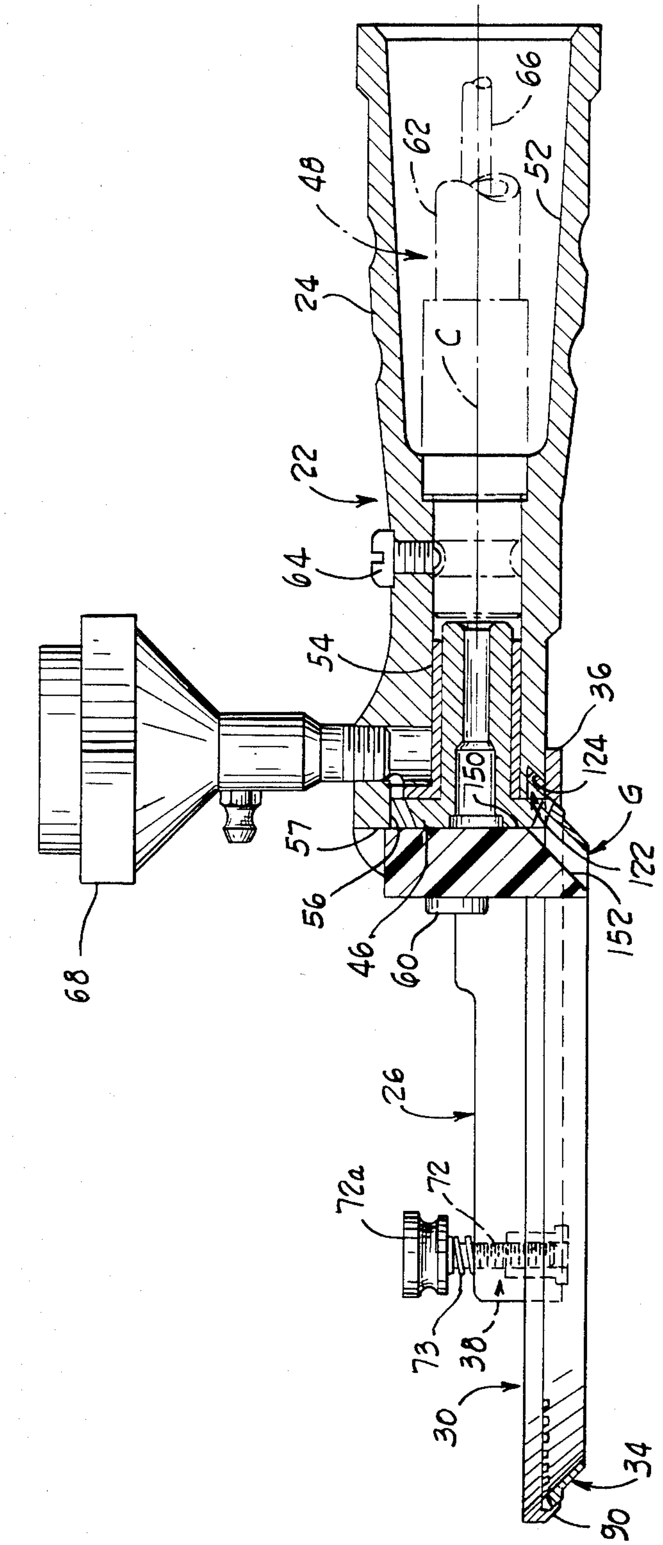
FIG. 2 is a longitudinal sectional view of the hand knife of FIG. 1 taken along the line 2—2.
Figure 3:
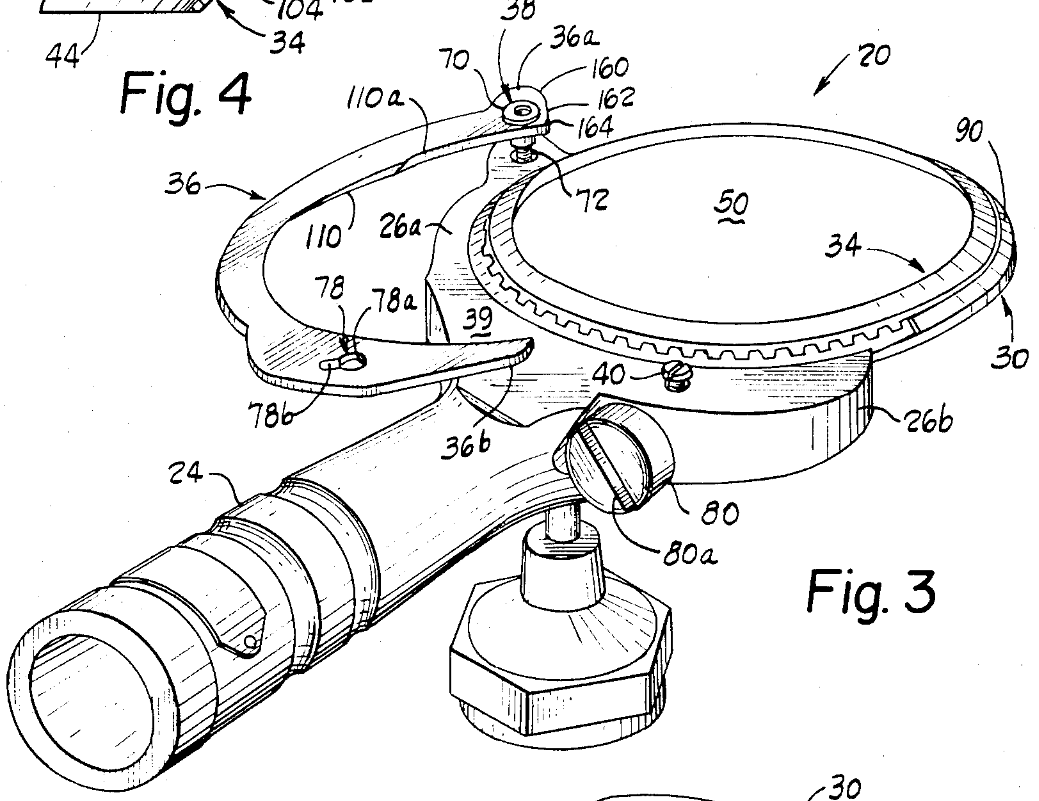
FIG. 3 is a perspective view of the hand knife of FIG. 1.

A hand knife 20 embodying the invention is best shown in FIGS. 1-3 and comprises a handpiece 22 having a tubular handle 24 and an arcuate end 26 including arm-like sector portions **26*a*, 26*b* (portion 26*a* being longer in the preferred embodiment); a ring-like housing 30 secured to the sector portions of the handpiece by two screws 32; a ring-like annular blade 34 rotatable relative to the housing; and a retaining shoe 36 connected to the handpiece by a pivot connection 38 and secured in a blade-retaining position against a front face 39 of the handpiece by a headed screw 40 in the sector portion 26*b*. The blade 34 is located and guided in rotation by both the housing 30 and the shoe 36**.

Both the housing 30 and blade 34 are of short axial length relative to their diameters. The blade is frustoconical in shape, with gear teeth 42 at the axial end of larger diameter, which is received against the housing, and has a cutting edge 44 formed at the other and smaller axial end, which extends axially from the general plane of the housing 30 and forms the front of the knife 20. See FIG. 4.

A power driven pinion gear 46 in the handpiece 22 engages the gear teeth 42 and rotates the blade relative to the housing. The pinion is driven by a rotated cable 48 powered by an external electric motor (not shown). Alternatively, the pinion can be powered by an air driven motor and gearing within the tubular handle part 24.

In use, the blade 34 is rotated at a relatively high speed in the direction of the arrow A and the face of the knife (i.e., the cutting edge 44) is placed against a product, and the knife is drawn along the product in the general direction of the handle, toward the operator, pulling part of the blade and housing that are remote from the handle through the product. A resulting slice of the product passes through the central opening 50 of the housing and blade. The construction and shape of the blade and housing facilitate cutting thin layers from the product; for example, patches of skin or thin layers of fat from the surface of a meat product.

As best illustrated in FIG. 2, the handpiece 22 is a metal casting and the tubular handle part 24 has a central recess or bore 52. A flanged tubular bushing 54 is located at the arcuate end of the handpiece. The pinion gear 46 is rotatably supported in the bushing and received in a recess 56 in the arcuate end surface 57 of the handpiece. A plastic cover or pinion cap 58 is secured to the handpiece by screws 60 to cover the pinion gear 46. A flexible cable sheath 62 is received in the tubular handle part 24 and secured within the handle by a screw 64. A central cable 66 is rotatably housed by the sheath 62 and is secured to the pinion gear 46 to drive the gear when the cable is rotated by an electric motor (not shown). A grease reservoir 68 on the handpiece communicates with the pinion to provide lubrication.

Figure 6:
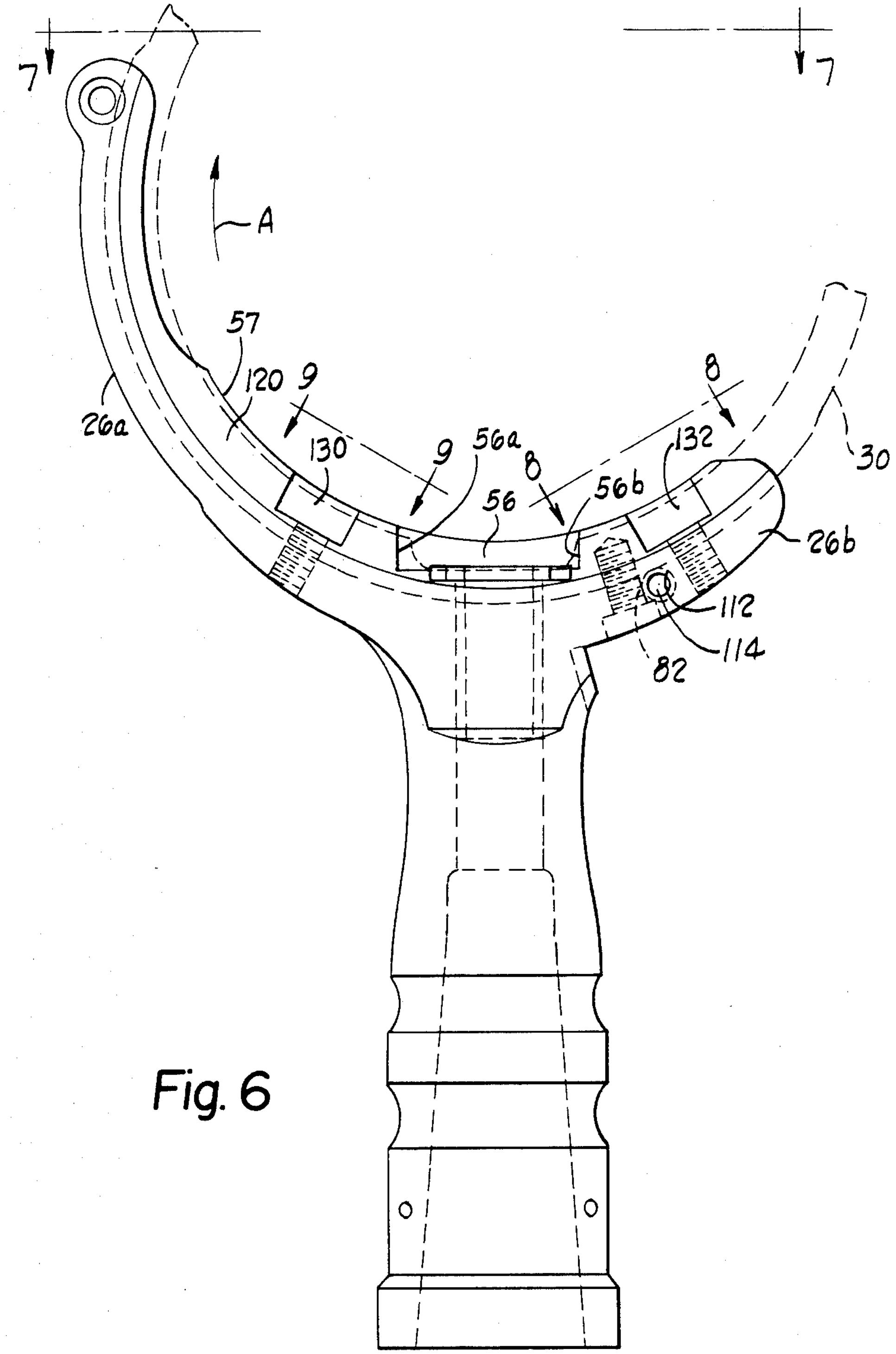
FIG. 6 is a plan view of a handpiece of the hand knife of FIG. 1.
Figure 7:
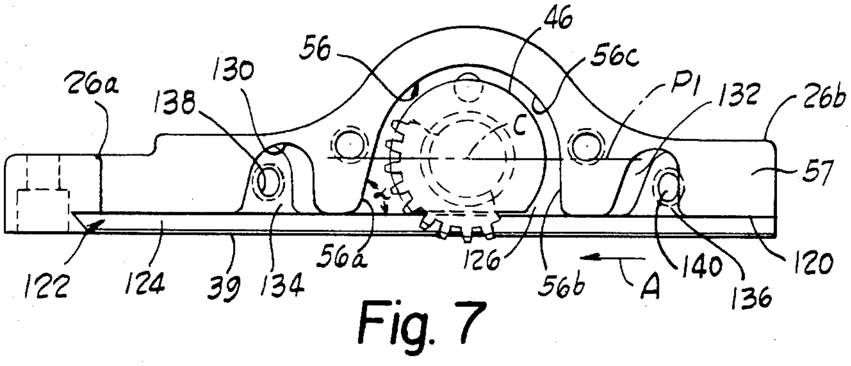
FIG. 7 is a partial front elevational view taken along the line 7—7 of FIG. 6.
Figure 8:
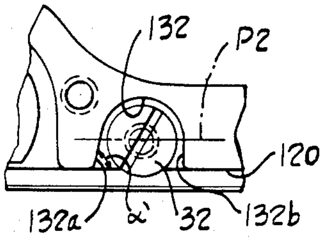
FIGS. 8 and 9 are partial elevational views taken along the lines 8—8 and 9—9 of FIG. 6.
Figure 9:
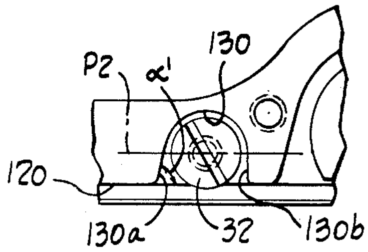

As best shown in FIGS. 6–9, the arcuate end formed by sector portions **26*a*,26*b* has a planar locating surface 120 for the blade housing, which forms one wall of an arcuate recess 122 in which a portion of the housing is received, and has an opposed wall 124, which also forms the recess, being inclined (see FIG. 2) with respect thereto. The recess 56 for the pinion gear opens at 126 through the surface 120 and the pinion gear extends through the opening 126 to engage with the gear teeth of the blade 34. As best shown in FIGS. 6 and 7, the recess 56 is part semi-cylindrical at 56*c* but has an outwardly flared portion 56*a* at one side only of the opening 126 and a straight portion 56*b* perpendicular to the surface 120. In the preferred embodiment shown, the outward flare 56*a* extends from a location at or slightly above a location along the periphery of the recess intersected by an imaginary plane P1 parallel to the planar surface 120 and passing through the central axis C of the central bore or recess 52. As shown, the flared portion is formed by a planar wall tangent to the cylindrical wall portion of the recess and extending an angle $\alpha$ of 75° with the surface 120. The flared portion is located at the trailing side of the recess 56**, considered relative to the direction of blade movement past the recess.

In addition, two recesses 130, 132, one on each opposite side of the recess 56 in the arcuate surface 57 and opening through the planar surface 120, receive the heads of the screws 32, which extend beyond the surface 120 to engage and retain the housing against the handpiece. These recesses are in part cylindrical but each also has an outwardly flared portion **130*a*, 132*a* at one side only of the openings 134, 136 through the surface 120, and a straight portion 130*b*,132*b* at the other side perpendicular to the surface 120. Each outward flare and straight portion extends from a location along the periphery of the respective recess intersected by an imaginary plane P2 parallel to the surface 120 and passing through central tapped holes 138, 140 that receive the screws 32. As shown, the flared portions 130*a*, 132*a* are each formed by a planar wall tangent to the partially cylindrical wall of the recess and extending at an angle of 75° with the surface 120. The flared portion is located at the trailing side of each recess 130, 132, considered relative to the direction of blade movement past the recesses. With the above-described construction of the recesses 56, 130, 132**, any particles of product that are carried into the recesses behind the blade will tend to flow around the wall of each recess and be discharged through the more open path provided by the flared portions and be carried away by blade rotation, rather than pack into the recesses and build up into a mass that binds against the blade.

The cover or pinion cap 58, as best shown in FIGS. 1 and 2 has a flat front face 149, and a cylindrically curved rear face 150 that overlies the pinion and that conforms to the curvature of the concave arcuate end surface 57 of the handpiece. A curved bevelled surface 152 between the curved back surface and flat front face faces the blade 34, follows the blade contour, and is spaced from the blade to form a gap G of uniform width along the peripheral length of the surface 152 between the blade and cap. The juncture between the rear face 150 and the bevelled surface 152 is below the imaginary plane P1 and above the planar surface 120. The width of the gap G is approximately 0.2 inch wide in the preferred embodiment, which is small enough to keep product scraps or cut pieces from traveling with the blade into the region of the pinion gear, but is large enough that small particles that otherwise tend to find their way into small openings and become impacted, will not be trapped and accumulate. This construction of the cap 58 and the gap G cooperate with the flared portions of the recesses to allow particles of product to be readily discharged from adjacent the pinion gear 46 and screws 32.

Figure 10:
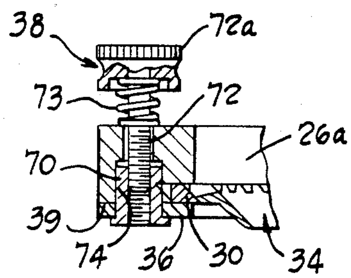
FIG. 10 is a sectional detail view taken along the line 10—10 of FIG. 1.

The pivot connection 38 at the end of the sector portion **26*a* (FIGS. 2 and 10) is comprised of an internally threaded bushing 70 secured to one end of the retaining shoe 36, a screw 72 with a knurled head 72*a*, and a spring 73 surrounding the screw and acting between the head 72*a* and the handpiece. The bushing is received in a hole 74 through the sector and the screw 72 that is received in the bushing acts against the spring on the opposite side from the retaining shoe so the screw draws the shoe against the handpiece. Loosening of the screw 72 allows the retaining shoe and bushing to be moved axially against the resistance of the spring 73 to move the shoe away from the front face 39 of the handpiece, so a portion of the shoe adjacent the pivot axis is moved out of the plane of the knife blade to allow the shoe to pivot about the axis of the screw 72 to the position shown in FIG. 3** for blade removal.

The securing screw 40 in the front face of the sector portion **26*b* secures the distal end of the shoe 36 by cooperating with a keyhole slot 78** in the shoe. The slot is elongated in a direction that allows the shoe to pivot a short distance toward and away from the blade while the screw is received in the slot.

A hand wheel or adjustment knob 80 with a shaft 81 is received in a threaded aperture 82 in the sector portion **26*b*. The hand wheel acts as an abutment to the shoe 36 for adjusting and maintaining the position of the shoe relative to the blade. A spring 83 surrounding the shaft 81 and acting against the hand wheel and sector portion 26*b* holds the hand wheel in adjusted position. The periphery of the hand wheel is smooth to prevent accidental adjustment if the operator's thumb or finger moves across the periphery during use of the knife. A slot 80*a*** is provided in the face of the hand wheel to facilitate adjustment.

Figure 4:
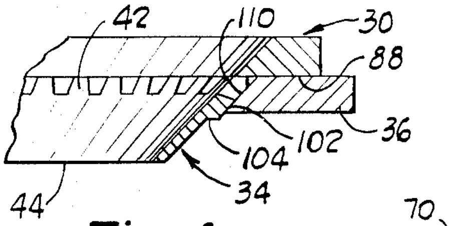
FIG. 4 is a partial sectional view taken along the line 4—4 of FIG. 1.
Figure 5:
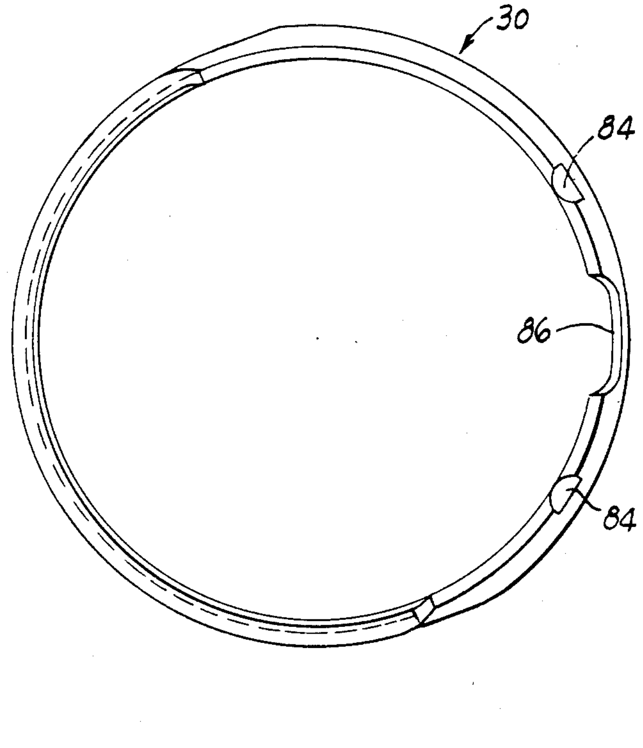
FIG. 5 is a plan view of a housing of the hand knife of FIG. 1.

The blade housing 30 is circular in shape, as best shown in FIG. 5, and has varying cross sectional shapes at different portions. The heads of the two securing screws 32 fit against flats 84 in the inside periphery of the housing, the screws being received in the threaded apertures 138,140 in the arcuate end 26 of the handpiece. The housing has a cut away portion 86 between the flats 84 to receive the pinion gear 46, allowing it to cooperate with the gear teeth of the blade 34. The housing has a radial face 88 at the front (FIG. 4), against which the blade 34 is located and against which it slides in rotation. The radial face varies in width circumferentially of the housing, being wider in that portion of the housing adjacent the arcuate end 26 of the handpiece, and being thinner along that part of the housing that extends beyond the arcuate end 26 of the handpiece.

A peripheral flange 90 extends about the radial face 88 in that portion of the housing that extends beyond the arcuate end 26 (i.e., beyond the sector portions 26*a*, 26*b*). The circumferential extent of the peripheral flange is no more than 180° about the housing. Ends 99, 100 of the peripheral flange are shown in FIGS. 1 and 3, and in the preferred embodiment are substantially diametrically opposite each other and directly adjacent the ends of sector portions 26*a*, 26*b*.

The blade 34 is located with the gear teeth portion 42 against the radial face 88 of the housing, and in part captured by the peripheral flange 90. The outer peripheral surface of the blade has a frusto-conical portion 102 (FIG. 4) about the gear teeth portion 42, which is the thickest portion of the blade. The frusto-conical portion 102 ends in a radial flange surface 104, where the thickness of the blade narrows from that of the teeth portion to a thinner part 105 that terminates in the cutting edge 44. The frusto-conical portion 102 rides against the inside surface of the flange 90, while the gear teeth portion 42 rides against the radial face 88. As best shown in FIG. 4, the retaining shoe 36 rests against the radial face 88 of the housing and also against the outer frusto-conical surface 102 of the blade.

The retaining shoe 36 is in the form of an arcuate plate substantially congruent with and overlying the front face 39 at the arcuate end 26 of the handpiece 22. An inner edge 110 of the shoe is beveled to correspond with the frusto-conical peripheral surface portion 102 of the blade and is shaped to the same radius of curvature so it bears against that blade portion when positioned with the center of curvature coincident with that of the blade center. In such a position, the keyhole slot 78 receives the headed securing screw 40. An enlarged portion 78*a* of the keyhole slot is larger than the head of the securing screw 40, and a narrower portion 78*b* receives the shank of the screw 40 when the shoe is located to contact the blade. In that position, the head of the screw prevents movement of the shoe away from the front face 39 of the handpiece.

The pivoted end 36*a* of the shoe is located peripherally a distance beyond 90° from the central axis of the handle 24 and pinion 46 and fewer than 110° . In the preferred embodiment shown, it is located 105° from the central axis. As a result, with close tolerances, pivotal adjustment of the shoe toward the blade would likely cause the shoe to bind against the blade adjacent the pivot in the area beyond 90° before the remainder of the shoe edge 110 engages the blade. A slightly recessed edge portion 110*a* prevents binding, but the depth of the recess is minimized to be certain the shoe along the portion 110*a* completely covers the teeth 42 of the blade 34 to inhibit the teeth from contacting the product being cut and carrying particles into the pinion gear and its recess. The portion 110*a* is concentric with the edge 110 but the curvature is of slightly greater radius (no more than 0.5 inch greater in the preferred embodiment).

A lobe 160 is located at the end 36*a* to accommodate the bushing 70. The shoe terminates at the end 36*a* in an edge 162 that extends substantially radially of the shoe curvature and a rounded juncture 164 of small radius is formed with the inner edge portion 110*a* of the shoe so the edge 162 of the shoe is directly adjacent the housing flange 90 and covers the teeth of the blade 34 so that no more than a tooth width is exposed at the juncture. At the opposite end 36*b* the shoe also is located directly adjacent the housing flange so no more than a tooth width is exposed. This arrangement inhibits the blade teeth from engaging product particles and carrying them with the blade into the drive mechanism. Loosening of the screw 72 at pivot 38 permits movement of the shoe away from the face 39 of the handpiece to allow movement of the shoe over the head of the securing screw 40 and to allow the portion of the shoe at the rounded juncture 164 to move away from (i.e., out of the plane of) the blade so when the shoe pivots away from the arcuate end 26, as shown in FIG. 3, and the juncture 164 moves toward the blade, there will be no interference between the juncture 164 and the blade.

Figure 11:
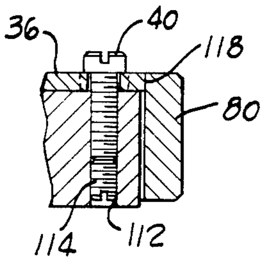
FIG. 11 is a sectional detail view taken along the line 11—11 of FIG. 1.

As shown in FIGS. 3, 6 and 11, the securing screw 40 is adjustable in a threaded bore 112 in the sector portion 26*b*. A set screw 114 in the threaded bore adjacent the opposite face of the handpiece locates the securing screw and establishes the distance between the front face 39 of the handpiece and the set screw head, so the shoe is closely received in the gap between the front face and the head of the screw 40.

An outer edge 116 of the shoe 36 has a lobe 118 providing a wider part of the shoe that extends beyond the sector portion 26*b* and is engaged by the hand wheel 80. Once the screw 40 is received in the keyhole slot 78, the hand wheel is adjusted to hold the shoe with a narrower portion of the slot under the screw head. Also, the hand wheel forces the inside beveled edge of the shoe against the blade, holding the blade in captured relationship to the housing flange 90. Any play between the blade and the housing flange is taken up by adjustment of the hand wheel, which also applies proper force to allow rotation of the blade relative to the housing.

To remove the blade from the housing, the hand wheel is rotated to back it away from the shoe, allowing the shoe to be pivoted about the pivot assembly 38, bringing the enlarged portion of the slot into alignment with the screw head. The screw 72 is then loosened and the shoe is moved away from the front face of the handpiece. beyond the screw 40, and is then pivoted away from the blade to a position shown in FIG. 3. The blade can then be moved out of the peripheral flange 90, toward the handle part 24 and lifted away from the housing and handpiece. A new blade is inserted by reversing the procedure. In this way, an operator can readily change blades without the use of tools or complex adjustments and frequent blade change is thereby encouraged and greater cutting efficiency achieved.

While a preferred embodiment of the invention have been described with particularity, it will be understood that modifications can be made therein without departing from the spirit and scope of the invention set forth in the appended claims.

I claim:

1. A handpiece for a hand knife for cutting meat or the like, comprising a handle portion adapted to be grasped by an operator, a portion for supporting a ring-like blade housing and blade, and a recess in the handpiece for a pinion gear that drives the blade in rotation, the recess opening through a surface of the handpiece that provides a seat for the blade housing, said recess having an outward flare at one side only of said opening.

2. A handpiece for a hand knife of the type having a rotary ring blade for cutting meat and the like, comprising a handle portion, an arcuate portion at one end of the handle portion extending in opposite directions from the handle portion and having a concave arcuate face and a planar surface transverse thereto, a bore in the handpiece opening through the arcuate face, and a recess in the arcuate face, surrounding the bore and opening through the planar surface, said bore and recess adapted to receive a drive pinion for a ring blade, said recess having an outward flare at one side only of the opening through the planar surface.

3. A handpiece as set forth in claim 2 wherein the flare extends at least from a location along the periphery of the recess intersected by an imaginary plane parallel to said planar surface and passing through the central axis of the bore.

4. A handpiece as set forth in claim 2 including at least a second bore and a second surrounding recess opening through the arcuate face, said second bore being threaded and said second recess opening through the planar surface, said second bore and second recess being adapted to receive a headed screw for retaining a circular housing to the handpiece, said second recess having an outward flare at one side only of the opening through the planar surface, said one side corresponding to the flared side of the first mentioned recess.

5. A handpiece as set forth in claim 4 wherein the flare extends at least from a location along the periphery of the recess intersected by an imaginary plane parallel to said planar surface and passing through the central axis of the bore.

6. A handpiece as set forth in claim 2 including a ring-like housing secured to the handpiece adjacent the arcuate face and planar surface, and a ring blade rotatably guided by the housing and having ring gear teeth by which the blade is rotated, wherein the center of curvature of said arcuate face is on an imaginary line extending along the central axis of the bore and the arcuate portion extends on one side of said line through more than 90 and fewer than 110 angular degrees and terminates in a remote end, and a generally planar blade-retaining shoe is pivoted to said remote end, said shoe having a concave arcuate blade-engaging surface with a relieved portion of slightly diminished width adjacent the pivoted end, the relieved portion being sufficiently wide to cover the ring gear teeth of a retained blade while providing clearance between the shoe and blade when the blade engaging surface is in blade engagement.

7. A handpiece as set forth in claim 6 wherein said one end of the blade-retaining shoe terminates in a surface that intersects the relieved portion substantially along a radial line beyond the location where the shoe is pivoted, and a pivot connects said one end of the shoe to said remote end of the arcuate portion, said pivot including means to allow relative movement of the shoe perpendicular to the pivot axis.

8. A handpiece as set forth in claim 2 including a ring-like housing secured to the handpiece adjacent the arcuate face and planar surface, and a ring blade rotatably guided by the housing and having ring gear teeth by which the blade is rotated, a pinion in said recess and a cap over said pinion, said cap having an inclined arcuate surface adjacent the blade, said cap being secured to the handpiece with the inclined arcuate surface spaced from the blade a sufficient distance to allow particles of cut product to flow from the pinion recess through the space.

9. A blade-retaining shoe for a rotary ring blade hand knife that has an arcuate handle portion to which the shoe is pivoted and a flat face against which the shoe rests when in a blade-retaining position, said shoe having means at one end to facilitate pivotably securing it to the arcuate handle portion and an arcuate beveled inner edge having two substantially concentric portions of different diameters, a shorter of said portions having a larger diameter and being located adjacent said one end.

10. A blade retaining shoe as defined in claim 9 wherein said one end terminates in a surface that intersects the shorter portion along a line radial to the curvature beyond the means that facilitates pivotably securing the shoe.

11. A pinion cap for a rotary ring blade hand knife that has an arcuate handle portion having an arcuate face in which a pinion gear is recessed and a ring-like housing and blade attached to the arcuate handle portion adjacent the arcuate face, said cap being adapted to be secured against the arcuate face of the arcuate handle portion to partially cover the recessed pinion gear, and having a flat front surface, an arcuately curved back surface complementary to the curvature of the arcuate face, and a bevelled arcuate edge surface complementary to a surface of the blade that opposes the edge surface when the cap is secured to the arcuate handle portion, the back surface and bevelled edge surface having an intersection or juncture adapted to be located approximately midway between a peripheral portion of the gear and the center of the gear.

12. A handpiece for a hand knife of the type having a rotary ring blade for cutting meat and the like, comprising a handle portion, an arcuate portion at one end of the handle portion having a concave arcuate face, a bore in the handpiece opening through the arcuate face adapted to receive a drive pinion for a ring blade, a ring-like housing secured to the handpiece adjacent the arcuate portion, and a ring blade rotatably guided by the housing and having ring gear teeth by which the blade is rotated, wherein the center of curvature of said arcuate face is on an imaginary line extending along the central axis of the bore and the arcuate portion extends on one side of said line through more than 90 and fewer than 110 angular degrees and terminates in a remote end, and a generally planar blade-retaining shoe pivoted to said remote end, said shoe having a blade-engaging surface with a relieved portion of slightly diminished width adjacent the pivoted end, the relieved portion being sufficiently wide to cover the ring gear teeth of a retained blade while providing clearance between the shoe and blade when the blade engaging surface is in blade engagement.

13. A handpiece as set forth in claim 12 wherein said one end of the blade-retaining shoe terminates in a surface that intersects the relieved portion substantially along a radial line beyond the location where the shoe is pivoted, and a pivot connects said one end of the shoe to said remote end of the arcuate portion, said pivot including means to allow relative movement of the shoe along the pivot axis.

14. A handpiece as set forth in claim 12 wherein said housing has a peripheral lip beyond said arcuate portion and the shoe extends from one end of the lip to the other, being spaced therefrom circumferentially a distance no greater than the width of a tooth of the ring gear.

15. A handpiece for a hand knife of the type having a rotary ring blade for cutting meat and the like, comprising a handle portion, an arcuate portion at one end of the handle portion, a ring-like housing secured to the handpiece adjacent the arcuate portion, said housing having a peripheral lip about a portion remote from the arcuate portion of the handle portion, and a ring blade rotatably guided by the housing and having ring gear teeth by which the blade is rotated, and a generally planar blade-retaining shoe arcuately shaped and movably carried by the handle portion adjacent said arcuate portion and extending from one end of the lip to the other, spaced circumferentially from the lip ends a distance no greater than the width of a tooth of the ring gear.

* * * * *